Nov. 23, 1948.                 W. WORTH                 2,454,297
                BY-PASSING VALVE FOR OIL TEMPERATURE CONTROL UNITS
Filed Dec. 8, 1944                                 2 Sheets-Sheet 1
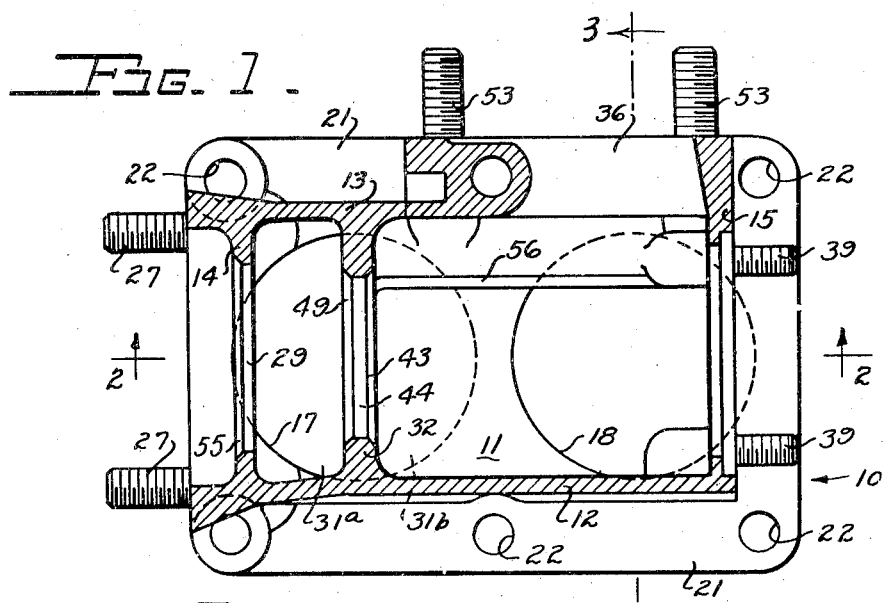
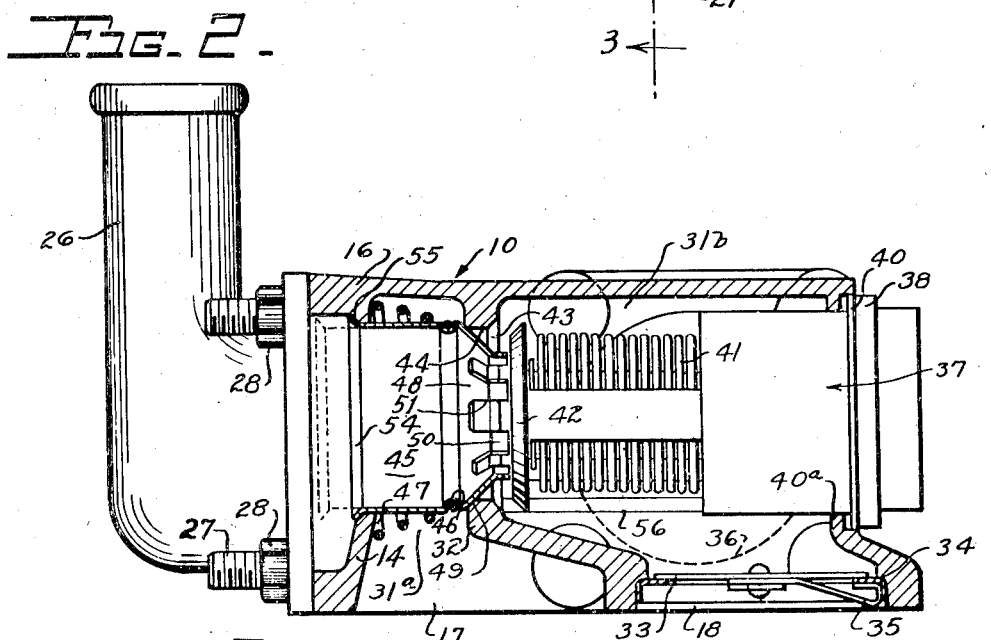
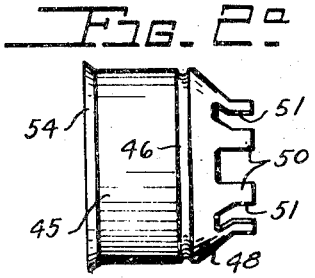
INVENTOR
WELDON WORTH
BY
ATTORNEYS Nov. 23, 1948.   W. WORTH   2,454,297
BY-PASSING VALVE FOR OIL TEMPERATURE CONTROL UNITS
Filed Dec. 8, 1944   2 Sheets-Sheet 2
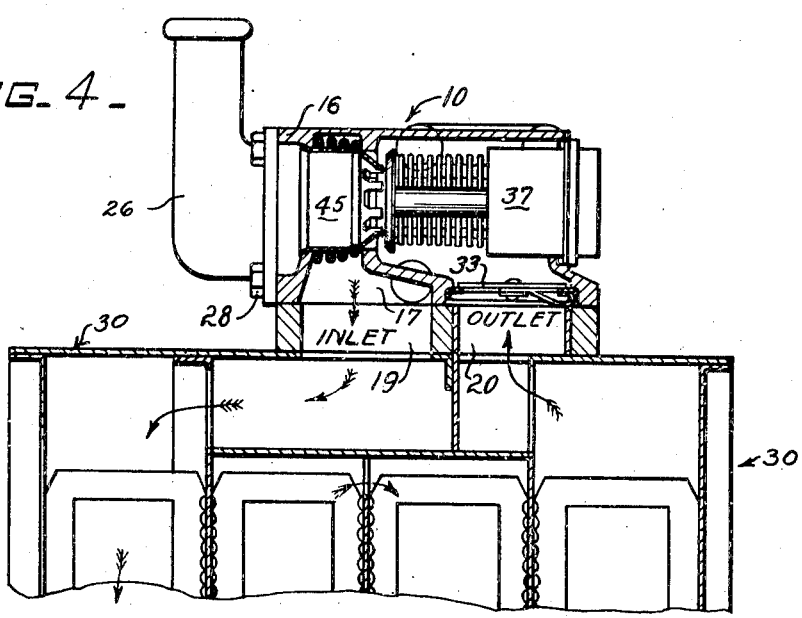
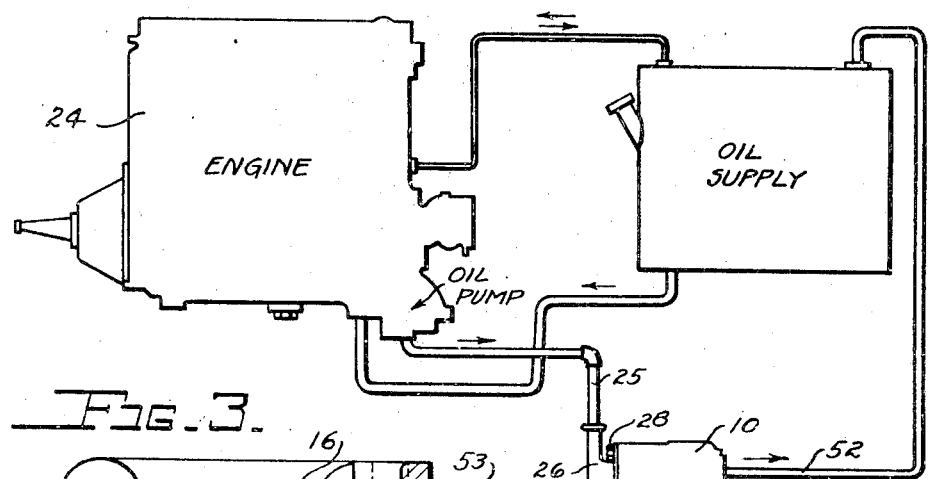
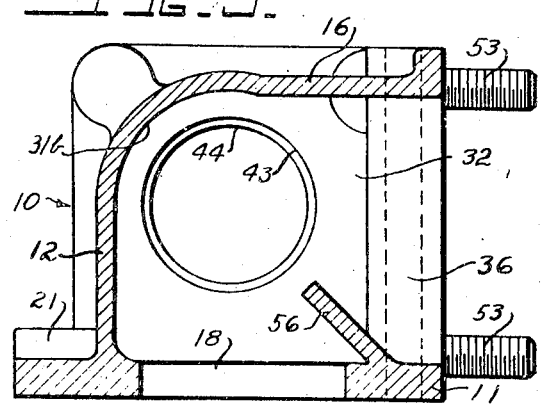
INVENTOR.
WELDON WORTH
BY
ATTORNEYS Patented Nov. 23, 1948

2,454,297

UNITED STATES PATENT OFFICE 2,454,297

BY-PASSING VALVE FOR OIL TEMPERATURE CONTROL UNITS

Weldon Worth, Dayton, Ohio

Application December 8, 1944, Serial No. 567,289

8 Claims. (Cl. 236—34)

(Granted under the act of March 3, 1883, as amended April 30, 1928; 370 O. G. 757)

The invention described herein may be manufactured and used by or for Government for governmental purposes, without the payment to me of any royalty thereon.

This invention relates to valves for oil temperature control units and the like. In the lubrication systems of aircraft engines it is usually necessary to cool the oil after it passes through the engine in order to maintain its temperature below the vaporizing point. The oil cooler in such a system must have ample cooling capacity for the most severe or abnormal operating conditions and will therefore have excess capacity for normal conditions. If over-cooling is to be prevented, it is necessary to have means for limiting the cooling according to operating conditions. The general object of the invention is to provide a practicable valve unit which will regulate automatically the amount of oil flowing through the oil cooler, hence will regulate the amount of cooling, so that the desired temperature regulation may be obtained. Other general objects are to provide a valve unit which is compact, of light weight and is reliable and safe in operation. A more specific object is to provide a valve unit which may be used with an oil cooler having no by-pass, and which itself by-passes the oil automatically under certain conditions, so that no part of the oil, or only a fraction of the oil flow, will pass into the cooler. A further object is to provide a simplified surge protection arrangement which will protect under any conditions that impose a pressure exceeding a predetermined amount. It is a further object to incorporate a check valve arrangement to close connecting passages automatically at a time when the position of the surge valve is such as to isolate other passages of the oil cooler. A further object is to provide a novel valve and valve seat arrangement in a valve unit of the indicated character which will make for economies in manufacture. Other specific objects will be explained or will be apparent in connection with the following description of the preferred embodiment of the invention shown in the accompanying drawings, wherein:

Fig. 1 is a horizontal longitudinal section through the valve unit, the two valve members being omitted;

Fig. 2 is a vertical medial longitudinal section taken on line 2—2 of Fig. 1, showing the complete valve and also showing an elbow connected to the valve unit;

Fig. 2a is a detail in elevation of a valve part;

Fig. 3 is a cross section on line 3—3 of Fig. 1, omitting the valve member;

Fig. 4 is a detail in vertical section showing how the valve unit interconnects with the oil cooler, only part of which is shown;

Fig. 5 is a diagrammatic view in elevation showing a lubricating system including the valve unit and oil cooler.

The valve unit of the present invention is preferably used with one of the oil cooler units disclosed in my pending application filed December 11, 1944, Serial No. 567,764, and is an improvement over the valve units disclosed in my Patent No. 2,279,285, dated April 7, 1942, and in my pending application Serial No. 373,150, filed January 4, 1941, now Patent No. 2,419,980, dated May 6, 1947. In a companion application Serial No. 567,288, filed concurrently herewith, I disclose another form of valve unit.

Referring particularly to the drawings, the valve unit body 10, which may be an aluminum alloy or other light weight metal casting, has the general shape of a parallelopiped, with a bottom wall 11, side walls 12, 13, end walls 14, 15 and top wall 16. The bottom wall 11 has two ports 17, 18, port 17 being adapted to register with the oil cooler inlet 19 and port 18 being adapted to register with the oil cooler outlet 20, as will be understood from Fig. 4. A marginal flange 21 is integral with and projects from the valve body on three sides in the plane of bottom wall 11 and has apertures 22 for studs (not shown) to secure the valve unit rigidly to the top of the oil cooler and in operative relationship thereto. A gasket (not shown) may seal the joint. Oil enters the valve unit from the lubricating system of the engine 24 (Fig. 5) through a hot oil line 25 and an elbow 26 secured by studs 27 and nuts 28 to one end of the valve unit 10 (Fig. 2). End wall 14 where elbow 26 is attached has a port 29 which may be termed the inlet port of the valve unit. Oil which enters inlet port 29 may pass out of the valve unit through port 17 into the oil cooler 30 (Fig. 4) under certain conditions or it may flow through chamber 31a into a chamber 31b, these chambers being formed by the inside walls of the valve unit body and by a transverse partition 32 intermediate the end walls 14, 15. The other port 18 in the bottom wall 11 opens into chamber 31b to discharge oil from the oil cooler past a flap type check valve 33 held on its press-fitted seat 34 by a spring 35. Chamber 31b communicates with an outlet port 36 in side wall 13 of the valve unit.

Within the valve unit is a removable thermal-controlled by-pass and pressure relief valve 37 which may be secured by a cap or flange 38 and nuts (not shown) threaded on studs 39 fixed to and projecting from the valve body. A packing 40 may provide a seal around the opening 40a where the valve 37 enters the valve body. Valve 37 has a bellows 41 which is an expansible metallic bellows, with a coil spring (not shown) on the inside tending to contract the bellows, and with a charge of ethyl chloride or other readily vaporized liquid chemical sealed within the bellows and adapted to expand the same against the resistance of said spring at a certain predetermined temperature. A valve disk 42 is secured to the free end of bellows 41 and is adapted to seat on a valve seat 43 surrounding port 44 in partition 32, thereby to close and seal said port when the bellows 41 expands sufficiently. The valve cap 38 also contains a relief spring (not shown) which in the open position holds the thermal element against a stop (not shown) in the valve cap and which permits the valve disk 42 to move away from the valve seat 43 regardless of the temperature, thus providing pressure relief, as disclosed in my pending application Serial No. 373,150, filed January 4, 1941. Seating and unseating of the valve disk 42 is entirely automatic and thermal-responsive, except for pressure relief, that is, it is independent of any changes in ambient oil pressure or atmospheric pressure, and is independent of the action of other parts of the valve unit. The pressure relief functions if the flow resistance or pressure drop through the cooler is excessive. However, the valve disk 42, responding to a thrust from the expanding bellows, operates another valve, as will now be described.

Slidably fitted in inlet port 29 is a hollow or tubular valve member 45 (Figs. 2, 2a) which may be of thin metal, having between its ends a circumferential groove 46 in which one end of a coil spring 47 fits. Coil spring 47 surrounds the valve member 45 and is preferably frusto-conical, with its larger end bearing against the inner face of end wall 14. Valve member 45 has a tapering or frusto-conical portion 48 which is seated on a seat 49 provided on partition 32, but on the opposite side thereof from seat 43; and when so seated, the valve member stops flow between inlet 29 and the port 17 which communicates with the inlet of the cooler. The tendency of coil spring 47 to expand causes valve portion 48 to remain on seat 49 except when unseated by valve disk 42. Extending from valve portion 48 are spaced legs 50 with relatively wide openings 51 between them, the extremities of said legs projecting beyond seat 43 into chamber 31b, so that valve disk 42 must contact the leg extremities before it may be seated on seat 43, or in other words, valve disk 42, before it is seated, must unseat valve portion 48. When valve portion 48 is seated, as illustrated in Fig. 2, communication between inlet port 29 and chamber 31b is not cut off because valve disk 42 is necessarily unseated and the plurality of relatively wide openings 51 permit a considerable by-passing flow of oil from the inlet port 29 through the hollow valve member 45 into chamber 31b. As check valve 33 closes port 18 to any reverse flow, oil entering chamber 31b through openings 51 will leave by the outlet port 36, to which a hose or pipe 52 is coupled (Fig. 5) by conventional means (not shown) secured to studs 53. At the opposite end, valve member 45 is flared outwardly as at 54 to provide a narrow frusto-conical seating portion which engages a seat 55 surrounding port 29 to prevent flow of oil between valve member 45 and port 29, which would cause the oil to enter the cooler through port 17 at a time when this would be undesirable. The oil pressure tends to hold flared portion 54 in sealing relation to seat 55. Obviously flared portion 54 also serves as a stop for valve member 45, as the latter may only be seated on seat 49 to the extent permitted by the engagement of flared portion 54 with partition 14. With valve portions 54 and 48 both engaging their respective seats, as shown, no oil may flow through port 17 into the cooler, and all of its must pass into chamber 31b and out through outlet 36. With valve disk 42 seated, the openings 51 will discharge oil into the cooler through port 17, and no oil reaches outlet 36 until it has passed through the cooler. Obviously valve member 45 is removable through the adjacent end of the valve body 10 if spring 47 is first disengaged from groove 46. The interior of the hollow or tubular valve member 45 forms a by-pass opening through the member, since oil flow therethrough and into the chamber 31b will by-pass the oil cooler. The valve chambers 31a and 31b may each be termed a passageway, since the chamber 31a forms a passageway from the valve inlet to the cooler inlet, while the chamber 31b forms a passageway from the cooler outlet to the valve outlet.

From the foregoing the operation should be more or less obvious. All the oil from the engine is pumped through the lubricating system until it reaches the inlet port 29 and the interior of the hollow valve 45. If the oil is cold, as when the engine has just been started, valve disk 42 will be off of seat 43 due to contraction of bellows 41, and the oil will flow through openings 51 into chamber 31b, thence out through outlet 36, and so on into the lubricating system and back to the engine. The oil cooler is therefore by-passed and isolated so long as the circulating oil is cold or cool. However, as soon as the oil temperature reaches a certain point, valve disk 42 is moved toward seat 43, which pushes the hollow valve 45 to the left against the resistance of spring 47, whereupon portions of the several openings 51 are exposed between partitions 14 and 32, so that a small flow of oil passes through port 17 into the cooler. This flow increases as valve disk 42 approaches closer to seat 43, and concomitantly, flow between the inside of tubular valve 45 and chamber 31b decreases, until finally the latter flow (the by-passing flow) ceases entirely as the valve disk 42 is seated, and all the oil reaching the valve unit is passed into the oil cooler for cooling before being returned through chamber 31b and outlet 36 to the lubricating system. Now the chamber 31b contains the thermal-responsive element 41; accordingly, the thermal-responsive element is exposed to the entire flow of oil which has been passed through the cooler. If operating conditions are such as to cause a considerable decrease in oil temperature, valve disk 42 will be unseated by contraction of the thermal-responsive element and some or all of the oil entering the inlet port 29 will flow through tubular valve 45 into chamber 31b and so out through the outlet without reaching the cooler. This state of affairs will continue until the temperature of the oil reaches the predetermined point at which valve disk 42 opens the valve 45 to divert some or all the oil into the cooler. The sensitivity of the removable by-pass and pressure-relief valve 37 may of course be varied or adjusted.

A deflector 56 is preferably provided in the form of a wall integral with the body 10 and extending upwardly from the bottom wall 11 at about 45° (Fig. 3) with its upper end or edge terminating just short of the expansible bellows 41 so that it does not interfere with movement of the bellows. Said deflector forces practically all the oil which flows out of the oil cooler past check valve 33 into chamber 31b to move around three-quarters of the periphery of the bellows before passing out through the outlet 36. In short, the bellows is exposed to the cooled oil from the cooler to approximately the same extent as to the oil by-passed through port 44. The bellows will thus respond to the average temperature of all the oil flowing through chamber 31b. No claim is made herein to the deflector.

While the valve unit has been shown as an attachment for oil coolers, it is probable that other apparatus may be advantageously used with the valve unit, and I do not desire to be limited otherwise than is required by the appended claims.

What I claim is:

1. An automatic valve for use with an oil cooler having an inlet and an outlet, said valve comprising a body provided with a valve inlet and a valve outlet, the interior of said body having two passageways separated by a partition, the first from the valve inlet to the cooler inlet and the second from the cooler outlet to the valve outlet, a port in said partition providing the only direct communication between said two passageways, a pair of valve members movably mounted within said two passageways respectively, one valve member being spring-urged to a closed position stopping oil flow from the valve inlet to the cooler inlet while allowing oil flow through said valve inlet and thence through said port, the other valve member when seated closing said port and stopping oil flow therethrough, a thermal-responsive element within the second passageway for operating said other valve member and responsive to a rise in temperature of the oil passing through said second passageway to seat said other valve member, and said other valve member as it approaches port-closing position being adapted to contact and move said one valve member to open position.

2. An automatic valve for use with an oil cooler having an inlet and an outlet, said valve comprising a body provided with a valve inlet and a valve outlet, the interior of said body being provided with a first chamber and a second chamber separated from each other by a partition, the walls of said first chamber being provided with a pair of openings communicating with said valve inlet and said cooler inlet respectively, the walls of said second chamber being provided with a pair of openings communicating with said valve outlet and said cooler outlet respectively, a port in said partition providing the only direct communication between said first and second chambers, a first valve member movably mounted in said first chamber, spring means acting to bias said first valve member to a closed position stopping oil flow from the valve inlet to the cooler inlet while allowing oil flow at the same time through said valve inlet and thence through said port, a second valve member movably mounted in said second chamber and adapted to seat on said port and stop oil flow therethrough, a thermal-responsive element within said second chamber for operating said second valve member and responsive to a rise in temperature of the oil passing through said second chamber to seat said second valve member on said port, and said second valve member as it approaches port-closing position being adapted to contact and move said first valve member to open position against the force exerted by said spring means.

3. An automatic valve for use with an oil cooler having an inlet and an outlet, said valve comprising a body provided with a valve inlet and a valve outlet, the interior of said body having two passageways separated by a partition, the first from the valve inlet to the cooler inlet and the second from the cooler outlet to the valve outlet, a port in said partition providing the only direct communication between said two passageways, a pair of valve members movably mounted within said two passageways respectively, one valve member having a by-pass opening therethrough and being spring-urged to a closed position stopping oil flow from the valve inlet to the cooler inlet while allowing oil flow through said vave inlet, said by-pass opening and thence through said port, the other valve member when seated closing said port and stopping oil flow therethrough, a thermal-responsive element within the second passageway for operating said other valve member and responsive to a rise in temperature of the oil to seat said other valve member, and said other valve member as it approaches port-closing position being adapted to contact and move said one valve member to open position.

4. An automatic valve for use with an oil cooler having an inlet and an outlet, said valve comprising a body provided with a valve inlet and a valve outlet, the interior of said body having two passageways separated by a partition, the first from the valve inlet to the cooler inlet and the second from the cooler outlet to the valve outlet, a port in said partition providing communication between said passageways, a pair of valve members movably mounted within said two passageways respectively and adapted to seat on opposite sides of said port, one of said valve members being hollow end-to-end with one end open to said valve inlet to permit the entire flow of oil to pass through said one valve member, said one valve member being spring-urged to seat on one side of said port and thus stop oil flow from the valve inlet to the cooler inlet while allowing oil flow through said valve inlet, said one valve member and thence through said port, the other valve member when seated closing said port and stopping oil flow therethrough, a thermal-responsive element with the second passageway for operating said other valve member and responsive to a rise in temperature of the oil to seat said other valve member, and said other valve member as it approaches port-closing position being adapted to contact and unseat said one valve member.

5. An automatic valve for use with an oil cooler having an inlet and an outlet, said valve comprising a body provided with a valve inlet and a valve outlet, the interior of said body having two passageways separated by a partition, the first from the valve inlet to the cooler inlet and the second from the cooler outlet to the valve outlet, a port in said partition providing the only direct communication between said passageways, a pair of valve members movably mounted within said two passageways respectively and adapted to seat on opposite sides of said port, one of said valve members being generally tubular in form and being slidably fitted within said valve inlet to permit the entire flow of oil to pass through said one valve member, said one valve member being spring-urged to seat on one side of said port and thus stop oil flow from the valve inlet to the cooler inlet while allowing oil flow through said valve inlet, said one valve member and thence through said port, the other valve member when seated closing said port and stopping oil flow therethrough, a thermal-responsive element within the second passageway for operating said other valve member and responsive to a rise in temperature of the oil to seat said other valve member, and said other valve member as it approaches port-closing position being adapted to contact and unseat said one valve member.

6. An automatic valve for use with an oil cooler having an inlet and an outlet, said valve comprising a body provided with a valve inlet and a valve outlet, the interior of said body having two passageways separated by a partition, the first from the valve inlet to the cooler inlet and the second from the cooler outlet to the valve outlet, a port in said partition providing the only direct communication between said passageways, a pair of valve members movably mounted within two said passageways respectively and adapted to seat on opposite sides of said port, a peripheral valve seat around said valve inlet, one of said valve members being hollow end-to-end with one end open to said valve inlet to permit the flow of oil through said one valve member, said one valve member being spring-urged to seat on one side of said port and simultaneously on said peripheral valve seat and thus stop oil flow from the valve inlet to the cooler inlet while allowing oil flow through said valve inlet, said one valve member and thence through said port, the other valve member when seated closing said port and stopping oil flow therethrough, a thermal-responsive element within the second passageway for operating said other valve member and responsive to a rise in temperature of the oil to seat said other valve member, and said other valve member as it approaches port-closing position being adapted to contact and unseat said one valve member.

7. A valve unit comprising, in combination, a body having an inlet port and an outlet port spaced from the inlet port, means to connect the valve unit with the lubricating system of an internal combustion engine so that oil from said system enters the valved body through said inlet port and returns to said systems through said outlet port, said system including an oil cooler, a pair of valve members with seats therefor, arranged inside the valve body, a spring tending to hold one of said valve members seated, the other valve member being adapted to unseat the spring-seated valve member when in a certain position, and a thermal-responsive element exposed to oil passing through the body and actuating said other valve member to seat the same when a certain temperature of the oil is reached, and to unseat the same when the temprature is lowered, the spring-seated valve member being seated when the said other valve member is well spaced from its seat, the valve body having a pair of ports, one of which has the flow therethrough governed by the spring-seated valve member and being adapted to communicate with the inlet of the oil cooler, the other of which communicates with the outlet of the oil cooler, the valve body having an interior port which forms seats for the pair of valve members, said spring-seated valve member being hollow and having one open end adjacent said inlet port to permit the entire oil flow through the inlet port to pass through the valve member from end to end, a partition dividing the valve unit body into two chambers, the ports which communicate with the oil cooler respectively opening into said chambers, the spring-seated valve member, when seated, sealing the interior of said valve member from the port which leads to the inlet of the oil cooler, the thermal-responsive valve member being located in one of said chambers and seating directly on said interior port to close the same.

8. A valve unit comprising, in combination, a body having an inlet port and an outlet port spaced from the inlet port, means to connect the valve unit with the lubricating system of an internal combustion engine so that oil from said system enters the valve body through said inlet port and returns to said system through said outlet port, said system including an oil cooler, a pair of valve members with seats therefor, arranged inside the valve body, a spring tending to hold one of said valve members seated, the other valve member being adapted to unseat the spring-seated valve member when in a certain position, and a thermal-responsive element exposed to oil passing through the body and actuating said other valve member to seat the same when a certain temperature of the oil is reached, and to unseat the same when the temperature is lowered, the spring-seated valve member being seated when the said other valve member is well spaced from its seat, the valve body having a pair of ports, one of which has the flow therethrough governed by the spring-seated valve member and being adapted to communicate with the inlet of the oil cooler, the other of which communicates with the outlet of the oil cooler, the valve body having an interior port which forms seats for the pair of valve members, said spring-seated valve member being hollow end-to-end and having one end open to said inlet port to permit the entire flow of oil through the inlet port to pass through the valve member from end-to-end, said spring-seated valve member having an opening which permits flow of oil from the hollow interior of said valve member to the port which leads to the inlet of the oil cooler, when said spring-seated valve member is unseated, the valve unit body having a chamber wherein the thermal-responsive valve member is located, said chamber communicating with the port which leads to the outlet port of the oil cooler, said spring-seated valve member opening permitting flow from the hollow interior of said valve member into said chamber, when said spring-seated valve member is seated, and the thermal-responsive valve member being aligned with and directly engaging the spring-seated valve member to unseat the same to cause the oil to pass into the oil cooler before returning to said chamber.

WELDON WORTH.

REFERENCES CITED

The following references are of record in the file of this patent:

UNITED STATES PATENTS

| Number | Name | Date |
| --- | --- | --- |
| 1,195,722 | Powers | Aug. 22, 1916 |
| 1,849,008 | Hutchinson | Mar. 8, 1932 |
| 2,288,599 | Ramsaur | July 7, 1942 |
| 2,374,639 | Miller | Apr. 24, 1945 |
| 2,379,109 | Shaw | June 26, 1945 |
| 2,396,053 | McEntire | Mar. 5, 1946 |

FOREIGN PATENTS

| Number | Country | Date |
| --- | --- | --- |
| 350,065 | Italy | July 5, 1937 |
| 371,173 | Italy | May 13, 1939 |